United States Patent [19]
Paananen et al.

[11] Patent Number: 6,022,394
[45] Date of Patent: Feb. 8, 2000

[54] PROCESS FOR FRACTIONING VINASSE

[75] Inventors: Hannu Paananen, Kantvik; Mirja Lindroos, Kirkkonummi; Juha Nurmi, Pinjainen; Tapio Viljava, Kantvik, all of Finland

[73] Assignee: Cultor Oy, Helsinki, Finland

[21] Appl. No.: 08/765,493

[22] PCT Filed: Jun. 7, 1995

[86] PCT No.: PCT/FI95/00329

§ 371 Date: Mar. 10, 1997

§ 102(e) Date: Mar. 10, 1997

[87] PCT Pub. No.: WO96/00776

PCT Pub. Date: Jan. 11, 1996

[30] Foreign Application Priority Data

Jun. 28, 1994 [FI] Finland ..................................... 943107

[51] Int. Cl.⁷ ............................... C05F 5/00; B01D 15/00
[52] U.S. Cl. ..................................... 71/26; 71/1; 210/635; 127/46.2; 127/51; 127/53
[58] Field of Search ..................... 71/1, 25, 26; 210/635; 127/46.2, 51, 53

[56] References Cited

U.S. PATENT DOCUMENTS

| | | | |
|---|---|---|---|
| 4,273,659 | 6/1981 | Robertiello et al. | 210/728 |
| 5,177,008 | 1/1993 | Kampen | 435/139 |

FOREIGN PATENT DOCUMENTS

| | | |
|---|---|---|
| 0411780 | 2/1991 | European Pat. Off. . |
| 1 497 480 | 10/1967 | France . |
| 2 436 817 | 4/1980 | France . |
| 2 573 088 | 5/1986 | France . |
| 2 596 748 | 10/1987 | France . |
| 3422177 C2 | 12/1984 | Germany . |

*Primary Examiner*—Gary P. Straub
*Attorney, Agent, or Firm*—Scully, Scott, Murphy & Presser

[57] ABSTRACT

The invention relates to a process for fractioning vinasse, in which process the pH value of the vinasse is lowered by adding acid, and the formed precipitate is separated in order to obtain an inorganic fraction, whereupon an organic fraction remains. The invention also relates to the products obtained. The inorganic fraction mainly contains potassium salt, and it is useful for example as a fertilizer. The organic fraction mainly contains organic acids, and it is useful for example as an additive in animal feed and in producing silage.

13 Claims, No Drawings

PROCESS FOR FRACTIONING VINASSE

TECHNICAL FIELD

The invention relates to a process for fractioning vinasse. More specifically, the invention relates to a novel and economical process for separating vinasse into a mainly inorganic fraction and a mainly organic fraction. The inorganic fraction mainly comprises potassium salt, and it is useful for example as a fertilizer. The organic fraction mainly comprises organic acids, and it is useful for example as a feed additive and in producing silage.

BACKGROUND

Molasses and different plant-derived sugar-containing extracts, like beet juice, cane juice and starch hydrolysates, are used as raw material in a wide range of fermentation industries in producing alcohol, yeast, citric acid, glutamic acid, lysine and many other fermentation products. When the primary product has been recovered from the fermentation broth, a dilute by-product broth remains. When this dilute by-product from the fermentation is concentrated, it is generally called "vinasse". Other names are CMS (Condensed Molasses Solubles) and CPL (Complement Proteique Liquide). The traditional uses of vinasse have been its disposal as waste to the environment (often without concentration), its use as a potassium fertilizer, and its use as an additive in animal feed. Vinasse has been used as an additive in animal feed because it provides metabolizable energy at a low cost and also acts as a binder. The value of vinasse as a source of protein has also been examined (Deleplanque, G. & Maindron, G., 1982: *Le C.P.L. et la Pulpe Surpressee Ensilee*, Secopal S.A.).

Vinasse contains a high proportion of potassium, which may cause problems for example as disorders in the magnesium absorption in an animal fed on vinasse (Tomas, F. M. & Potter, B. J., 1976: The effect and site of action of potassium upon magnesium absorption in sheep, Aust. J. Agric. Res., 27, 873–880; Fontenot, J. P., Allen, V. G., Bunge, G. E., and Goff, J. P., 1989: Factors influencing magnesium absorption and metabolism in ruminants. Journal of American Science, 67, 3445–3455). Processes have been developed to reduce the high proportion of potassium (FR 1 497 480, Lesaffre & Cie., 1967; FR 2 573 088, Beghin-Say, S.A., 1986; NL 6 800 313, Julsingba, J., 1969; and DE 1 817 550, 1970). The processes are based on precipitating potassium as a salt or as a double salt in the presence of sulphate ions under essentially neutral conditions. Vinasse products with reduced potassium content are sold under the tradenames of Prouvital, Proteinal, Sirional, Viprotal, etc.

Environmental restrictions have limited the disposal of vinasse as a waste and consequently increased the supply of vinasse as an additive for animal feed and as a fertilizer. The demand for these two purposes is limited, and a serious oversupply situation thus exists on the market. Therefore there is an increased interest in recovering valuable components from vinasse.

For example betaine can be recovered through chromatographic separation methods. Betaine can also be recovered by utilizing ion exchangers, which may be either cationic or anionic. Other valuable components which can be recovered are glycerol, monosaccharides, amino acids and succinic acid.

After these valuable components have been recovered, a different kind of vinasse remains, the concentrations of the remaining components in the vinasse being higher than before. The potassium content of the product is very high, thus limiting its use in animal feed. On the other hand, the percentage of the organic compounds in the product is also high, thus limiting its use in fertilizer applications.

PRIOR ART

The literature in the art describes processes for removing potassium from vinasse. FR Patent 1,497,480 (Lesaffre et Cie) discloses a process where vinasse obtained from yeast production is first concentrated to at least a 60% dry solids content. After that, sulphuric acid and ammonia are added so that the pH of the resulting liquid remains neutral. Potassium then precipitates as sulphate, and the sulphate crystals are removed through centrifugation. Adding ammonia results in a smaller yield of potassium. Furthermore, ammonia is a substance harmful to animals, and its use in animal feed is prohibited in many countries.

FR Patent 2,573,088 (Begin-Say, S.A.) discloses a similar process, where, however, sulphuric acid, ammonia or organic amine is added to dilute vinasse.

FR Patent 2,596,748 (Swenson S.A.) also discloses a process similar to the aforementioned Lesaffre reference, and equipment developed for performing the process. According to FR Patent 2,596,748, the process comprises at least two evaporative stages followed by at least two stages of crystal separation, and the process is realized in a concentration unit comprising at least two evaporators connected in series. The depotassified liquid is obtained as the overflow from the separation stage where the dry solids content is highest. The crystals formed in this stage are dissolved and recirculated to the evaporative stage where the dry solids content is lower. The separation stage where the dry solids content is lower produces a potassium sulphate product. The depotassified liquid from this separation stage is passed to a second evaporative stage for further concentration.

The fractionation of vinasse into different components is also described. Betaine can be recovered through chromatographic separation processes, as described in U.S. Pat. Nos. 4,359,430 and 5,127,957 (Heikkilä et al.). Betaine can also be recovered by utilizing ion exchangers, which may be either cationic or anionic. The recovery of glycerol and glucose, and the separation of amino acids is described in Burris, B. D., 1986: Recovery of Chemicals such as Glycerol, Dextrose, and Aminoacids from Dilute Broths, International Conference on Fuel Alcohols and Chemicals from Biomass, Miami Beach, Fla. European Patent Application 0 411 780 A2 (Kampen) discloses a process where, for example, ethanol, glycerol, succinic acid and betaine are recovered from mash. Potassium sulphate and free flowing distiller's dry grain are also recovered. According to this reference, the mash is prepared first, and the ethanol is separated from it through distillation. The remaining stillage is then clarified by subjecting it to a cross-flow microfiltration process utilizing inorganic membranes having a pore size in the range of about 0.1 to 10 microns, the permeate is subjected to one or more separation processes based on ion exchange and/or chromatography, and the separated products are purified. Example 8 of the reference describes a process for fractioning beet stillage. The beet stillage is a by-product of the fermentation of sugar beet into ethanol, and it is clarified with a process where the stillage is subjected to cross-flow microfiltration utilizing inorganic alpha aluminium oxide membranes having a pore size of 0.2 microns, the permeate is treated enzymatically at 50° C. to hydrolyse proteinaceous matter, it is evaporated into a solids content of over 66% by weight, and crystallized by cooling and crystallizing, in a malaxeur, potassium sulphate crystals which are removed through centrifugation. The beet stillage clarified in this way is subjected to several steps of chromatographic separation to recover betaine and glycerol, and after these components have been recovered the remaining stillage is concentrated, dried and used either as a solid fertilizer premix or as a distiller's dry grain, i.e. DDG.

The stillage obtained by means of the above-described process comprises, however, drawbacks which cause problems for the aforementioned applications.

Firstly, the potassium level of the product increases when other components, such as betaine and glycerol, are removed. The high level of potassium offers no advantages; on the contrary, it is even harmful for the animals. Such a product can thus be used as an additive in animal feed only in limited amounts.

Secondly, the high level of potassium makes the product unstable: the potassium salts tend to precipitate during storage. This might be why Kampen suggest that the product be dried. However, drying is a very expensive process step.

Thirdly, the high proportion of organic material is also a serious drawback in fertilizer applications. Large quantities of the product must be spread on the fields in order to achieve the required dose of potassium. The organic material is subjected to microbial decomposition causing thus considerable smell problems in the environment.

BRIEF DESCRIPTION OF THE INVENTION

The present invention relates to a novel and economical process for separating vinasse into a mainly inorganic fraction and a mainly organic fraction. In the process according to the invention, the pH of the vinasse is lowered by adding acid, and the resulting residue is separated from the liquid. The residue forms the inorganic fraction, and the remaining liquid the organic fraction. The process is thus simple and easy to perform.

The residue formed according to the invention, i.e. the inorganic fraction, mainly comprises potassium salt, and it is useful for example as a fertilizer.

The invention also relates to the organic fraction which remains after the inorganic fraction has been removed. The organic fraction is an acidic product which contains a high content of organic acids and a low content of potassium and which is valuable both as an additive in animal feed and as a preserving additive in producing silage.

DETAILED DESCRIPTION OF THE INVENTION

The invention thus relates to a process for fractioning vinasse. The fractionation produces two fractions: a mainly inorganic fraction and a mainly organic fraction. The process according to the invention is characterized in that vinasse is subjected to chromatographic separation, the pH value of the resultant organic acid-containing residue is lowered by adding acid, and the formed precipitate is separated in order to obtain an inorganic fraction, whereupon an organic fraction remains. Generally the pH is lowered to a value of less than about 5, preferably to a value of about 3.0 to 3.8. The pH is lowered by means of an acid, which frees the potassium in the form of a salt. Preferably sulphuric acid is used, since the resulting potassium sulphate is easy to remove from the liquid. Other conventional acids, such as hydrochloric acid, can also be used for the purpose according to the invention.

The process according to the invention is applicable to different types of vinasse, which are obtained as a by-product of the fermentation of molasses and from which one or several components have been removed, if desired. When the vinasse is subjected to a column process, it is preferably pretreated through clarification.

Vinasse can be clarified by means of, for example, the cross-flow microfiltration process disclosed in European Patent Application 0 411 780 A2 (Kampen), or by centrifuging the vinasse in a high-efficiency centrifuge preferably at an elevated temperature. A process suitable for the latter purpose is disclosed in the co-pending Finnish Patent Application 2,940,302. The clarified vinasse is then concentrated in an evaporative system to a dry solids content of about 50 to 80% by weight, preferably about 55 to 65 wt.-%. When the content is higher than 35 wt.-%, the potassium salts begin to precipitate/crystallize. The precipitate or the crystals are separated from the concentrated vinasse by conventional means, for example through decantation, filtration or through a combination of these processes, and the liquid is filtered by means of pressure filters by using filter plates, a filter aid or a combination of these.

The precipitate or the crystal slurry obtained in the process may be used as such or combined to a by-product having a high content of potassium, the product being obtained when some components have been recovered from the clarified vinasse by means of a column process. If these two products are combined in the fractionation of the invention, the advantage is achieved that the potassium level increases and crystallization becomes thus easier. Therefore this embodiment is considered preferred.

After filtration, the clarified vinasse may be stored or used immediately in a column process to recover desired components. These components may include for example betaine, glycerol, inositol and amino acids.

The vinasse, which has possibly been clarified and from which desired components may have been removed in the above-described manner, is fractioned according to the invention into an inorganic and organic fraction. In order to form the inorganic fraction, potassium is removed from the vinasse by means of the novel process according to the invention where potassium is removed in one stage in the form of a salt and/or a double salt by lowering the pH of the vinasse through adding acid. The potassium salts may be precipitated or crystallized in a controlled manner in an evaporation crystallizer. The potassium is removed from the vinasse preferably by adding sulphuric acid and by concentrating the vinasse in an evaporator which allows crystals to be formed.

Acid is added to the liquid to free the potassium in the form of a salt. Preferably sulphuric acid is added to form sulphate ions and to increase the yield of the potassium salt. The formation of the salts depends on how many ions available for salt formation are present. The formation of the potassium salts can thus be controlled by adding a desired amount of acid, for example sulphuric acid, which provides $SO_4^{2-}$ ions. The amount of the acid added in turn determines the pH value. So much acid is added that the pH is less than about 5, preferably less than about 4.2 to 4.5. Most preferably the pH is 3.0 to 3.8.

The vinasse is concentrated to a dry solids content of about 40 to 80 wt.-%, preferably about 55 to 65 wt.-%. The potassium salts begin to precipitate/crystallize when the dry solids content rises above 35 wt.-%. The evaporator where the concentration is then performed should preferably be an evaporation crystallizer (a forced-circulation flash evaporator, a forced circulation evaporator, a DTB evaporator, a continuous agitated pan crystallizer, etc.), so that the crystallization, such as the formation of crystal nuclei, and the growth and size of the crystals, can be controlled better. It is possible to add acid either to dilute vinasse or to vinasse concentrated to the precipitation/ crystallization concentration of the potassium salts. The latter alternative is more preferable, since it is then easier to control the precipitation/crystallization. The resulting potassium sulphate precipitate is separated by conventional means, for example through filtration, decantation, centrifugation, or by using a combination of these processes.

The potassium salts/crystals form most of the inorganic fraction. When sulphuric acid is used to lower the pH of the vinasse, the proportion of potassium sulphate of the dry solids content is usually about 70 to 90%. The proportion of potassium is thus about 30 to 42%. The inorganic fraction can be used for example as a fertilizer.

After the depotassification, the organic fraction remains. One of the largest components of this fraction is formed by the organic acids, the proportion of which is about 18 to 45%, preferably about 30 to 45% based on the dry solid matter. The main part is comprised by lactic acid and pyrrolidone carboxylic acid (PCA), which form together about 10 to 20%. In addition to these, the fraction may also comprise for example acetic acid, maleic acid, succinic acid, propionic acid and formic acid in smaller concentrations, usually less than 1%. The fraction further comprises a relatively large amount of nitrogen-containing compounds; the total content of nitrogen in the fraction is about 5 to 12%, and the amino acid content is about 1 to 10%. The total amount of carbohydrates is about 5 to 35%. The proportion of ash is about 12 to 30% based on the dry solid matter. Depending on the processing, the betaine concentration varies from about 1 to 20%.

As noted above, the potassium content of the organic fraction can be adjusted to a desired level by adjusting the amount of the sulphuric acid added. A usual potassium content is about 3.0 to 5.5%. The pH varies typically from 3.0 to 4.0.

The original raw material of the organic fraction is plant-derived material. The composition of the plant material varies on the basis of the variety, soil, fertilizers, weather and other conditions. The methods used in the processing of the plant material also influence the composition of the final product. The composition of the organic fraction therefore varies considerably. It is thus clear for one skilled in the art that the compositions described here with their components and concentrations are only examples. The scope of the invention thus contains also other similar compositions.

In the following, a typical composition of an organic fraction prepared from sugar beet is shown. The concentrations are shown as percentages based on the dry solid matter.

| Monosaccharides | 0.2% |
|---|---|
| Disaccharides | 1.2% |
| Other carbohydrates | 8% |
| Total nitrogen | 6.5% |
| Betaine | 2.4% |
| Amino acids | 7% |
| Organic acids | 36% |
| Potassium | 4% |
| Ash | 15% |

The organic fraction according to the invention is useful for example as an additive in animal feed and in producing silage.

The effect of the organic fraction according to the invention can be estimated for example by determining the loss of the dry solid matter of silage. When the conditions of the preparation of silage are poor, the silage is spoiled due to undesired micro-organisms which cause strong gas formation. A part of the dry solid matter of the silage is thus lost as gas, and the economic exploitation of the silage is diminished. The effect of the organic fraction on the loss of dry solid matter during preservation can be determined by measuring the gas formation. The experiment was conducted by using as forage for example timothy and rye-grass which were provided with different concentrations of organic fraction. The results are shown in the following table.

TABLE

The effect of the organic fraction on the loss of dry solid matter of silage.

| | Loss of dry solid matter (%) | |
|---|---|---|
| Preservative | timothy | rye-grass |
| Control | 4.3 | 5.8 |
| | 4.6 | 6.2 |
| | 4.6 | 6.6 |
| Org. fraction | 4 | 3.6 |
| 8 1/tn | 3.8 | 2.8 |
| | 4.1 | 2.7 |
| Org. fraction | 2.5 | 1.6 |
| 16 1/tn | 2.3 | 1.5 |
| | 2.4 | 1.4 |

The results show that the organic fraction clearly diminishes the loss of dry solid matter even when it is used in such a small amount as 8 1/tonne, both for timothy and rye-grass. When the organic fraction was added in the amount of 16 1/tonne, the loss of dry solid matter was diminished by half for the timothy and by one quarter for the rye-grass.

The following detailed examples are provided to illustrate the invention. It is clear for one skilled in the art that the described process steps and parameters may be modified without deviating from the basic idea of the invention. Thus the examples should not be understood as limiting the scope of the invention.

EXAMPLE 1

After the fermentation stage of alcohol production, yeast was removed from the fermented mash through centrifugation. The mash was then conveyed to a distillation column, where the alcohol was removed. The column bottoms formed dilute vinasse, which still contained about 0.05 to 1.5% by volume of insoluble solids. The solids are typically formed of small yeast cells, other microbial cells, debris from broken cells, etc. The dry solids content of the liquid varied between 6.5 and 13 wt.-%, and the potassium content between 10.7 and 11.7 wt.-% of dry substance.

The solids-containing liquid was heated to about 85 to 95° C. The pH was adjusted to a value of about 6.5 to 7.0, and the liquid was clarified in a disc stack clarifier centrifuge (Westfalia SB7) at a rotational speed of 8500 rpm. The clarified vinasse was concentrated in an evaporator to a solids content of about 59 to 65% by using a forced-circulation evaporator (Rosenlew). Potassium sulphate crystals began to form at the solids content of about 40 wt.-%.

The potassium sulphate crystals were removed as a slurry through decantation. The crystals sank to the bottom, and the relatively clear liquid was decanted from the top. Decantation based on gravity was used here. It is evident to one skilled in the art that it is also possible to use other methods and means, for example a centrifugal decanter, or filtration. The total amount of the separated potassium salt crystal slurry was 16% by volume.

The potassium salt crystals were recovered from the slurry with a filter press (Seitz Orion) comprising paper filter plates (Carlson). The crystals can also be recovered by means of other types of filters or, for example, a basket centrifuge having a perforated or a net-like screen.

The decanted liquid was also filtered with a filter press (Seitz Orion) with paper filter plates (Carlson) to remove the fine crystals and the remaining insoluble solids. A filter aid (Kenite 300) was also used. The filtration was very easy to perform, and the solids space of the filter was filled almost completely during the process.

The resultant clarified vinasse was then conveyed to a pilot scale chromatographic separator and separated into two fractions: a betaine fraction containing betaine, glycerol, inositol, monosaccharides and some amino acids, and a debetainized vinasse fraction which contained most of the ionizable material, the compounds with a high molecular weight, etc.

The vinasse fraction with a pH of about 6.9 and potassium level of about 14% based on the dry solid matter was concentrated to a dry solids content of about 59 to 61% by using a forced-circulation evaporator (Rosenlew). The evaporation was performed under vacuum at an absolute pressure of 120 to 200 mbar. Sulphuric acid (96%) was added slowly to the liquid in order to maintain a good crystal growth rate but to avoid the formation of new crystal nuclei. No neutralizing agent was added. The final pH of the liquid was about 3.1. At this point the slurry contained about 20 wt.-% of crystals. The crystals were separated with a basket centrifuge having a perforated metal screen (Heine). The dry solids content of the crystal cake was 98%, of which potassium comprised 34%. The potassium content of the organic fraction was 4.9%, the organic acid content 30% and the amino acid content 4%.

EXAMPLE 2

Residual vinasse, which was obtained when betaine was separated chromatographically from the vinasse, was processed in the following manner. 10 kilograms of concentrated sulphuric acid was added to 600 litres of residual vinasse which had a dry solids content of 16.1%, of which potassium comprised 13.6%, the pH of the liquid thus decreasing to 3.9. 200 litres of the acidified liquid was passed to an evaporation crystallizer, i.e. a vacuum boiling pan of 0.4 m$^3$ (manufactured by A. Grönroos Oy). The mass was heated at a pressure of 230 to 250 mbar and at the temperature of 68 to 70° C. When the refractometric dry solids content of the mass increased to 30%, the addition of fresh liquid was started and the liquid volume was maintained at about 100 litres. Simultaneously with the feeding of the liquid, sulphuric acid was added at a rate sufficient to keep the pH of the mass below 3.5. When the feeding was finished, the evaporation was continued until the refractometric dry solids content of the mother liquor was about 68.5% and pH value 3.06. The mass was then taken to a cooling crystallizer, where it was cooled to about 26° C. during 16 hours. The cooled mass was centrifuged by means of a basket centrifuge (Heine). The centrifugal yield was 30 kg of crystal cake and 99 kg of liquid organic fraction. The dry solids content of the crystal cake was 97.3%, of which potassium comprised 32.1%, the potassium sulphate content being thus 71.2% based on the dry solid matter. The potassium content of the organic fraction was 4.1% based on the dry solid matter.

EXAMPLE 3

The evaporation crystallization was performed in the manner described in Example 1, using the same parameters, but the heat treatment was finished when the refractometric dry solids content of the mother liquor was 60.0% and the pH value was 3.1. The mass was then taken to a cooling crystallizer, cooled to 26° C. and centrifuged in the manner described in Example 1. The centrifugal yield was 25 kg of crystal cake and 121.5 kg of liquid organic fraction. The dry solids content of the crystal cake was 98.2%, of which potassium comprised 40.1%, the potassium sulphate content thus being 89.8% based on the dry solid matter. The potassium content of the organic fraction was 4.9% based on the dry solid matter.

EXAMPLE 4

Fresh vinasse obtained from distillation and having an average dry solids content of 11.7%, of which potassium comprised in average 10.7%, was heated to 85 to 95° C., after which the pH was adjusted to a value of about 6.5 to 7.0. The hot vinasse was clarified in a disc stack clarifier centrifuge, from where it was continuously fed to a forced-circulation evaporator of the rising film type and concentrated to a dry solids content of 60 ±1%. The concentrated vinasse was decanted by passing it through a settling tank with the residence time of 10 hours. The slurry containing precipitated potassium sulphate was removed from the bottom of the tank at a volumetric rate of 10% of the total flow. The dry solids content of the slurry was 67%, of which potassium comprised 14.5%. The slurry was heated to 60° C. and passed through a plate-and-frame type filtering unit (Seitz Orion) with a filter surface of 2.8 m$^2$. After the filtration of 270 l of the slurry, the filtering pressure rose sharply indicating thus that the filter chambers were full. The filtering was then ended, and the liquid in the filter chambers was replaced with air. The filtering unit was opened and the filter cake of 90.5 kg was recovered. The cake had a dry solids content of 78.4%, of which potassium comprised 25.9%.

The decanted liquid having the dry solids content of 58.5%, of which potassium comprised 10.4%, was heated to 90° C. and filtered using the same filtering unit. Diatomaceous earth (Kenite 300) was used as filter aid, the dosage varying from 0.2 to 0.4% (w/v). The slurry filtrate, 210 l in volume and with a dry solids content of 60.1% of which potassium comprised 9.2%, was combined with the 2430 litres of the decantation overflow filtrate. The combined clear filtrate was diluted to a dry solids content of 50%, check-filtered, and betaine was recovered from it chromatographically. After the chromatographic separation of betaine, 9500 litres of residual vinasse was obtained, the dry solids content of the vinasse being 15.8%, of which potassium comprised 13.4%.

The cake from the above-described slurry filtration was dissolved into the residual vinasse, the potassium content of which thus increased to 13.9%. 6.6 kilograms of concentrated sulphuric acid was added to 400 l of this liquid, the pH of the liquid thus decreasing to a value of 3.8. 200 litres of the acidified liquid was transferred to an evaporation crystallizer, i.e. a vacuum boiling pan of 0.4 m$^3$ (manufactured by A. Grönroos Oy), and evaporation-crystallized in the manner described in Example 1 by adding sulphuric acid in an amount sufficient to keep the pH of the mass below 3.5. The heat treatment was finished when the refractometric dry solids content of the mother liquor increased to about 61.1%, and the pH value was 3.1. The mass was then passed to a cooling crystallizer, cooled to about 26° C., and centrifuged. The centrifugal yield was 19 kg of crystal cake and 83 kg of liquid organic fraction. The dry solids content of the crystal cake was 98.0%, of which potassium comprised 39.3%, the potassium sulphate content being thus 87.8% based on the dry solid matter. The potassium content of the organic fraction was 4.8% based on the dry solid matter.

EXAMPLE 5

After the fermentation stage of yeast production, yeast was removed from the fermented mother liquor through centrifugation. The mother liquor formed dilute vinasse which still contained about 0.01 to 0.8% by volume of insoluble solids. The solids are typically formed of small yeast cells, other microbial cells, debris from broken cells, etc. The dry solids content of the liquid varied between 3 to 7 wt.-%, and the potassium content between 11.2 to 13.1% based on the dry solid matter.

The solids-containing liquid was heated to about 85 to 95° C. The pH was then adjusted to a value of about 6.5 to 7.0, and the liquid was clarified with a high-efficiency clarifier centrifuge (disc stack clarifier centrifuge, Westfalia NA7) at a rotational speed of 8500 rpm. The clarified liquid typically contained about 0 to 0.05% of insoluble solids. The efficiency of the insoluble solids removal was typically above 90%.

The clarified vinasse was concentrated in the manner described in Example 1 with similar results.

The potassium sulphate crystals were removed in the manner described in Example 1.

The decanted vinasse was filtered in the manner described in Example 1.

The vinasse pretreated in this manner was separated in a pilot scale chromatographic FSB-SMB separator in the manner described in Example 1.

The debetainized vinasse fraction with a pH of about 7.5 was concentrated to a dry solids content of about 68 to 69% by using a forced-circulation evaporator (Rosenlew). Sulphuric acid (96%) was then added slowly to the liquid in order to maintain a good crystal growth rate but to avoid the formation of new crystal nuclei. No neutralizing agent was added. The final pH of the liquid was about 3.1. At this point the slurry contained about 20 wt.-% of crystals. The crystals were separated with a basket centrifuge having a perforated metal screen. The dry solids content of the crystal cake was 97%, of which potassium comprised 32%. The potassium content of the organic fraction was 4.1%, the organic acid content 33%, and the amino acid content 2%.

EXAMPLE 6

Beet vinasse, obtained from the production of alcohol, having a potassium content of about 12% based on the dry solid matter and a pH value of about 5.6 was concentrated to a dry solids content of 59 to 61 wt.-% by using a forced-circulation evaporator (Rosenlew). The evaporation was performed under vacuum at an absolute pressure of about 120 to 200 mbar. Sulphuric acid (96%) was added slowly to the liquid. The final pH of the liquid was about 3.1. At this point the slurry comprised about 18 wt.-% of crystals. The crystals were removed by using a basket centrifuge having a perforated metal screen (Heine). The dry solids content of the crystal cake was about 97%, of which potassium comprised about 32%. The potassium content of the organic fraction was about 5.2%, the organic acid content about 22%, and the amino acid content about 3%.

We claim:

1. A process for preparing an organic acid containing fractions of vinasse comprising:
   (a) concentrating chromatographic separated vinasse to a dry solid content of about 35 to 45 wt %;
   (b) adding inorganic acid to the concentrated vinasse product of step (a) to lower the pH to a value less than 5.0 and precipitate potassium contained therein as a salt; and
   (c) separating the precipitated potassium salt from the organic fraction, thereby isolating the organic acid containing fraction of vinasse.

2. The process according to claim 1, in which the added acid lowers the pH to a value of about 3.0 to 3.8.

3. A process for preparing an organic acid-containing fraction of vinasse comprising:
   (a) concentrating chromatographic separated vinasse to a dry solid content of about 40 to 80 wt %;
   (b) adding sufficient amount of inorganic acid to the concentrated vinasse product of step (a) to precipitate potassium contained therein as a salt; and
   (c) separating the precipitated potassium salt from the organic fraction, thereby isolating the organic acid containing fraction of vinasse.

4. The process according to claim 3 wherein in step (a), the chromatographic separated vinasse is concentrated to a dry solids content of about 55 to 65 wt %.

5. A process for preparing an organic acid containing fraction of vinasse comprising:
   (a) subjecting vinasse to chromatographic separation;
   (b) concentrating said separated vinasse to a dry solid content of at least 35 wt %;
   (c) adding inorganic acid to said separated vinasse in an amount sufficient to obtain an acidic pH value and precipitate potassium contained therein as a salt; and
   (d) separating the precipitated potassium salt from the organic fraction, thereby isolating the organic acid containing fraction of vinasse.

6. The process according to claim 5 wherein the inorganic acid added to the separated vinasse is sulfuric acid or hydrochloric acid.

7. The process according to claim 6 wherein the inorganic acid is sulfuric acid.

8. The process according to claim 5 wherein the inorganic acid is added to the separated vinasse in an amount sufficient to adjust the pH thereof to a value less than 5.0.

9. The process according to claim 5 wherein the separated vinasse has been concentrated to a dry solid content of about 35 to 45 wt %.

10. The process according to any one of claims 1–9 wherein the separated vinasse is concentrated in an evaporation crystallizer.

11. The process according to claim 10 wherein the separated vinasse is concentrated to a dry solid content of about 40 to 80 wt %.

12. The process according to claim 11 wherein the separated vinasse is concentrated to a dry solid content of about 55 to 65 wt %.

13. The process according to claim 8 wherein the pH is adjusted to a value of about 3.0 to 3.8.

* * * * *

UNITED STATES PATENT AND TRADEMARK OFFICE
CERTIFICATE OF CORRECTION

PATENT NO. : 6,022,394
DATED : February 8, 2000
INVENTOR(S) : Hannu Paananen, et al.

It is certified that error appears in the above-identified patent and that said Letters Patent are hereby corrected as shown below:

On The Title Page, [86]: "Mar 10, 1997" should read --Mar. 6, 1997--

Column 3, Line 61: "in." should read --in--

Column 10, Line 41, Claim 10: "claims 1-9" should read --claims 5-8--

Signed and Sealed this

Eighth Day of May, 2001

*Attest:*

NICHOLAS P. GODICI

*Attesting Officer*    Acting Director of the United States Patent and Trademark Office